United States Patent
Murray et al.

(10) Patent No.: US 12,172,757 B2
(45) Date of Patent: Dec. 24, 2024

(54) BLOWER SYSTEM

(71) Applicants: ROLLS-ROYCE plc, London (GB); Rolls-Royce Corporation, Indianapolis, IN (US)

(72) Inventors: Christopher A. Murray, Nottingham (GB); Nicholas Howarth, Derby (GB); Daniel Swain, Fishers, IN (US); Ian J. Bousfield, Nottingham (GB)

(73) Assignees: Rolls-Royce PLC, London (GB); Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 18/155,351

(22) Filed: Jan. 17, 2023

(65) Prior Publication Data
US 2023/0242260 A1  Aug. 3, 2023

Related U.S. Application Data

(60) Provisional application No. 63/300,947, filed on Jan. 19, 2022.

(30) Foreign Application Priority Data

Jan. 31, 2022  (GB) ....................................... 2201200

(51) Int. Cl.
*B64D 13/06* (2006.01)
*F02C 7/32* (2006.01)
(Continued)

(52) U.S. Cl.
CPC ................ *B64D 13/06* (2013.01); *F02C 7/32* (2013.01); *F04D 25/04* (2013.01); *F04D 25/045* (2013.01);
(Continued)

(58) Field of Classification Search
CPC ............ B64D 13/06; B64D 2013/0603; B64D 13/006; B64D 13/02; B64D 33/08;
(Continued)

(56) References Cited

U.S. PATENT DOCUMENTS 3,844,113 A * 10/1974 Lockwood, Jr. .......... F01D 1/36
60/39.15
10,371,055 B2 * 8/2019 Snape ...................... F02K 3/075
(Continued)

FOREIGN PATENT DOCUMENTS

EP  2554799 A2  2/2013
EP  3056714 A1  8/2016
(Continued)

OTHER PUBLICATIONS

European search report dated May 19, 2023, issued in EP Patent Application No. 22214878.5.
(Continued)

*Primary Examiner* — Dominick L Plakkoottam

(57) ABSTRACT

There is provided a blower system for providing air to an airframe system, comprising a rotor configured to be mechanically coupled to a spool 440 of a gas turbine engine, wherein the rotor is configured to: in a blower mode, be driven to rotate by the spool to discharge air to an airframe discharge port for supply to an airframe system; and, in an engine drive mode, receive air from an external air source via an impingement port that is configured to direct the received air onto the rotor and thereby drive the rotor to rotate to drive the spool to.

18 Claims, 11 Drawing Sheets

(51) Int. Cl.
*F04D 25/04* (2006.01)
*F04D 29/68* (2006.01)

(52) U.S. Cl.
CPC .... *F04D 29/684* (2013.01); *B64D 2013/0603* (2013.01)

(58) Field of Classification Search
CPC ... B64D 41/00; B64D 2013/0696; F02C 7/32; F02C 6/08; F02C 7/277; F04D 25/04; F04D 25/045; F04D 29/503; F04D 29/684; F05D 2210/44
See application file for complete search history.

(56) References Cited

U.S. PATENT DOCUMENTS

| | | | | |
|---|---|---|---|---|
| 10,457,401 | B2* | 10/2019 | Feulner | F02C 1/02 |
| 10,550,770 | B2* | 2/2020 | Foutch | F02C 3/10 |
| 2016/0138501 | A1* | 5/2016 | Keating | F02B 37/007 60/605.1 |
| 2016/0167789 | A1 | 6/2016 | Knight et al. | |
| 2016/0237905 | A1* | 8/2016 | Suciu | F02C 3/04 |
| 2016/0237909 | A1* | 8/2016 | Snape | F02C 7/185 |
| 2016/0369705 | A1* | 12/2016 | Mackin | F02C 6/08 |
| 2019/0233123 | A1* | 8/2019 | Sharpe | F02C 6/08 |

FOREIGN PATENT DOCUMENTS

| | | | |
|---|---|---|---|
| EP | 3208195 | A1 | 8/2017 |
| EP | 3584165 | A1 | 12/2019 |
| EP | 3517436 | B1 | 5/2020 |
| EP | 3517437 | B1 | 5/2020 |
| EP | 3517438 | B1 | 6/2020 |
| EP | 4001115 | A1 | 5/2022 |

OTHER PUBLICATIONS

Great Britain search report dated Jul. 25, 2022, issued in GB Patent Application No. 2201200.9.

* cited by examiner

BLOWER SYSTEM

CROSS-REFERENCE TO RELATED APPLICATIONS

This specification is based upon and claims the benefit of priority from U.S. Provisional Patent Application No. 63/300,947, filed 19 Jan. 2022, and United Kingdom Patent Application No. 2201200.9, filed 31 Jan. 2022, the entire contents of which are incorporated herein by reference.

BACKGROUND

Technical Field

The present disclosure relates to blower systems for providing air to an airframe system. The disclosure also concerns a gas turbine engine having a blower system and an aircraft having a blower system or a gas turbine engine.

Description of the Related Art

It is known to pressurise and ventilate a cabin of an aircraft using engine bleed air which is bled from a compressor section of the core of a gas turbine engine. Bleeding high pressure air from the gas turbine engine reduces its efficiency and thereby increases its fuel consumption.

Blower systems which make use of engine bleed air which is bled from a lower pressure source of a gas turbine engine (such as a bypass duct) and which subsequently compress the engine bleed air prior to delivering it to the cabin are also known, as described in EP3517436 B1, EP3517437 B1 and EP3517438 B1.

SUMMARY

According to a first aspect, there is provided a blower system for providing air to an airframe system, comprising: a rotor configured to be mechanically coupled to a spool of a gas turbine engine; wherein the rotor is configured to: be driven to rotate by the spool in a blower mode to discharge air to an airframe discharge port for supply to the airframe system; and receive air from an external air source via an impingement port to drive the spool to rotate in an engine drive mode.

In the engine drive mode the rotor may drive the spool to rotate for starting the gas turbine engine. Additionally or alternatively, the engine drive mode may be used to drive the spool to rotate at a speed below a starting speed of the engine, for example to reduce or prevent the formation of thermal bow of engine components.

The blower mode may be a cabin blower mode, such that at least a portion of the air discharged to the airframe discharge port is supplied to an aircraft cabin.

The impingement port may direct air onto the rotor and thereby cause the rotor to rotate in the engine drive mode.

The blower system may be configured so that the rotor rotates in the same direction in both the cabin blow mode and the engine drive mode. The impingement port may be configured (e.g. located relative to the rotor and/or arranged to direct air onto the rotor in a predefined direction) so that rotor rotates in the same direction in both the cabin blow mode and the engine drive mode.

It may be that the blower system further comprises a variable transmission for mechanically coupling the rotor to the spool.

The impingement port may be one of a plurality of impingement ports, each configured to direct air onto the rotor and thereby cause the rotor to rotate.

It may also be that the rotor is configured to rotate in a first direction to compress air for discharge to the airframe discharge port; and wherein the or each impingement port is configured to direct air onto the rotor to drive it to rotate in the same first direction.

The rotor may be configured to function as a centrifugal compressor in the blower mode.

The rotor may comprise a plurality of rotor blades each having a leading side and a trailing side with respect to the direction of rotation in the blower mode; and the or each impingement port may be configured to direct air to impinge onto the trailing side of each rotor blade.

Alternatively, the rotor may comprise a plurality of compressor blades on a first side of the rotor for directing air to the airframe discharge port in the blower mode; and the rotor may further comprise a plurality of turbine blades on a second side of the rotor for receiving air from the or each impingement port in the engine drive mode.

Otherwise, the rotor may comprise a plurality of compressor blades on a first side of the rotor for directing air to the airframe discharge port in the blower mode; and a plurality of impulse scoops may be provided on the second side of the rotor, the plurality of impulse scoops being configured to receive air from the or each impingement port in the engine drive mode.

It may be that blower system is configured to provide a recirculation pathway for recirculating compressed air in the blower mode, and wherein the recirculation pathway includes the or each impingement port.

The blower system may further comprise: a primary valve configured to isolate the airframe discharge port from the airframe system in the engine drive mode; and a secondary valve configured to isolate the or each impingement port from the external air source in the blower mode.

According to a second aspect there is provided a gas turbine engine for an aircraft, the gas turbine engine comprising a blower system in accordance with the first aspect.

According to a third aspect there is provided an aircraft comprising a blower system in accordance with the first aspect or a gas turbine engine in accordance with the second aspect.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts (or spools) that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

According to an aspect, there is provided an aircraft comprising a blower system or a gas turbine engine as described and/or claimed herein.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

DESCRIPTION OF THE DRAWINGS

Examples will now be described with reference to the accompanying drawings, which are purely schematic and not to scale, and in which.

DETAILED DESCRIPTION

Figure 1:
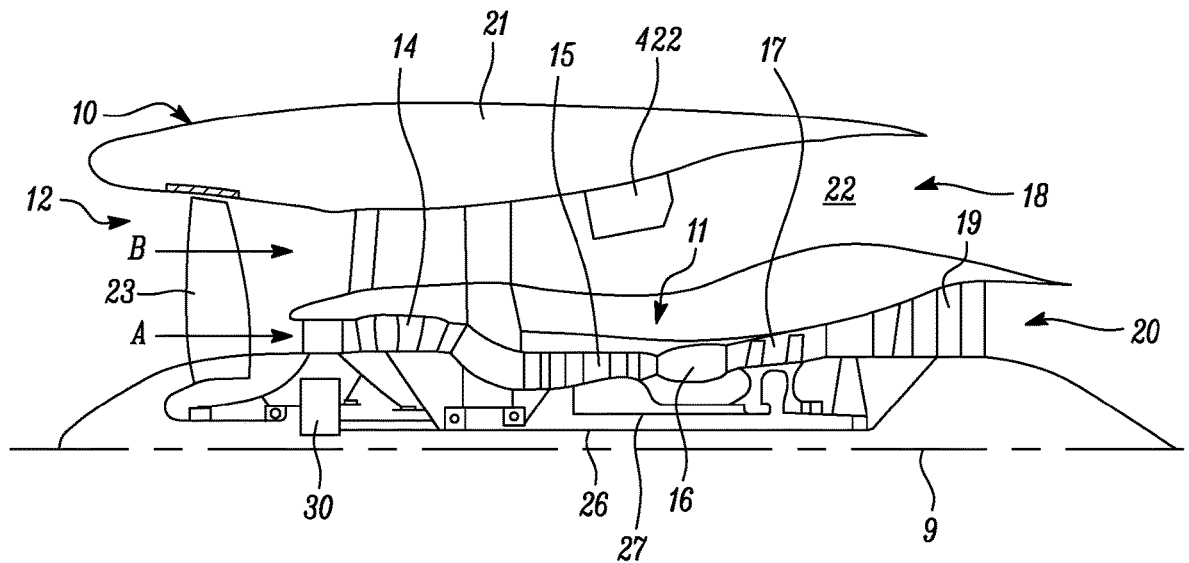
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The bypass duct 22 may comprise an engine bleed port 422 for supplying air from the bypass duct to a blower system or the like. In other examples, the engine core 11 may comprise an engine bleed port 422. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
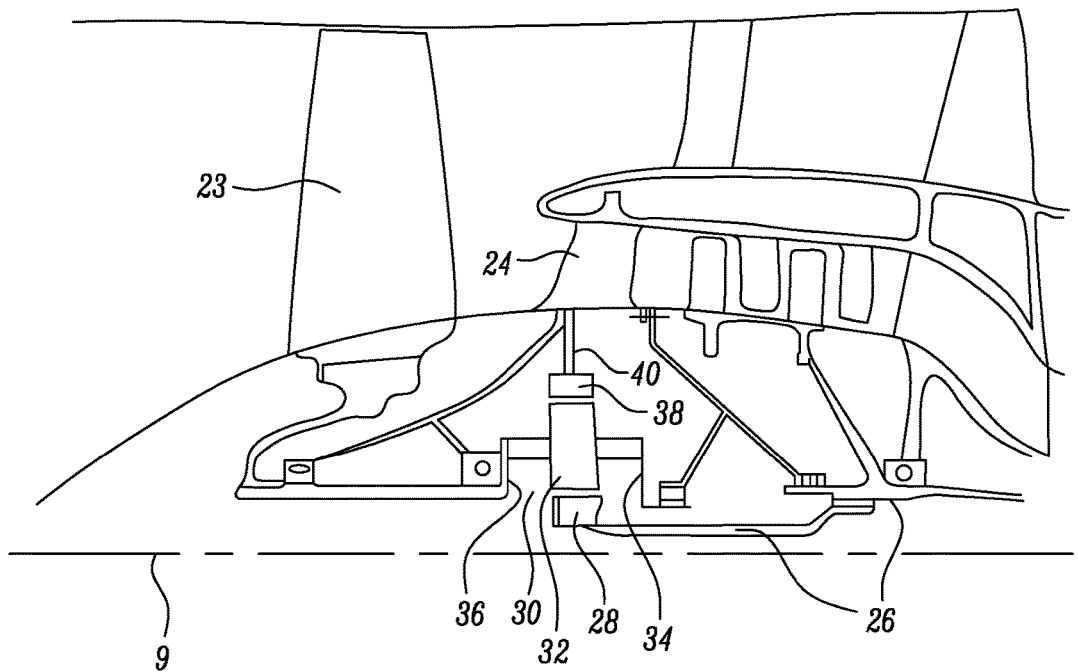
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26 (or spool), which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 (or spool) with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
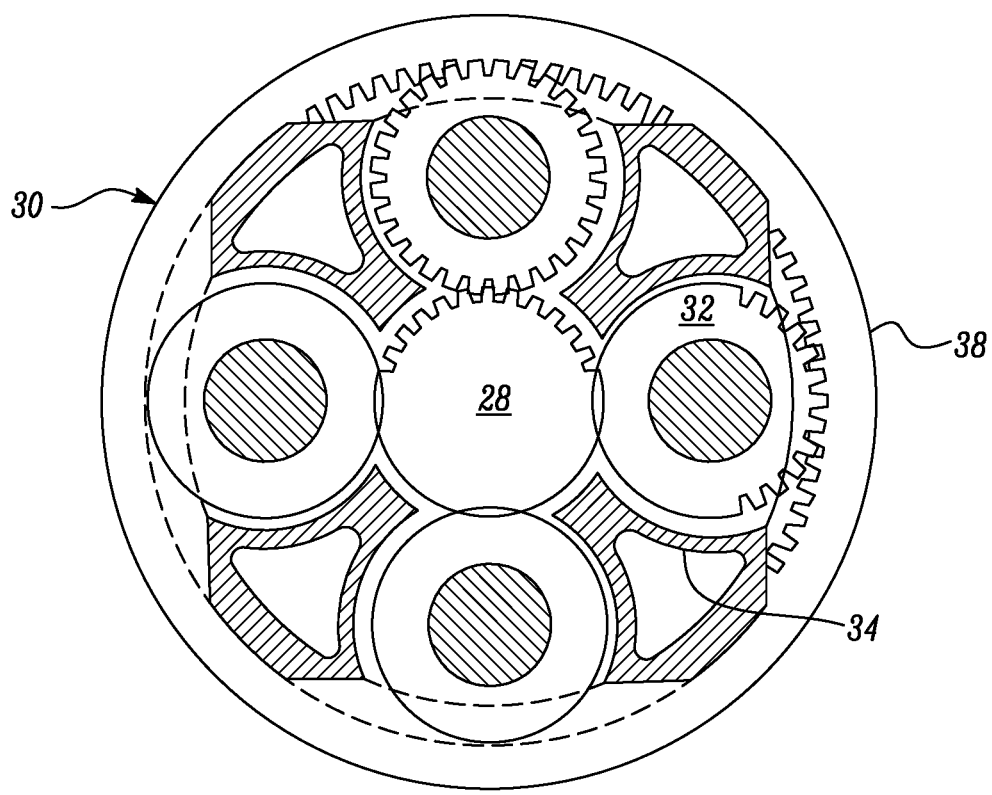
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed disclosure. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
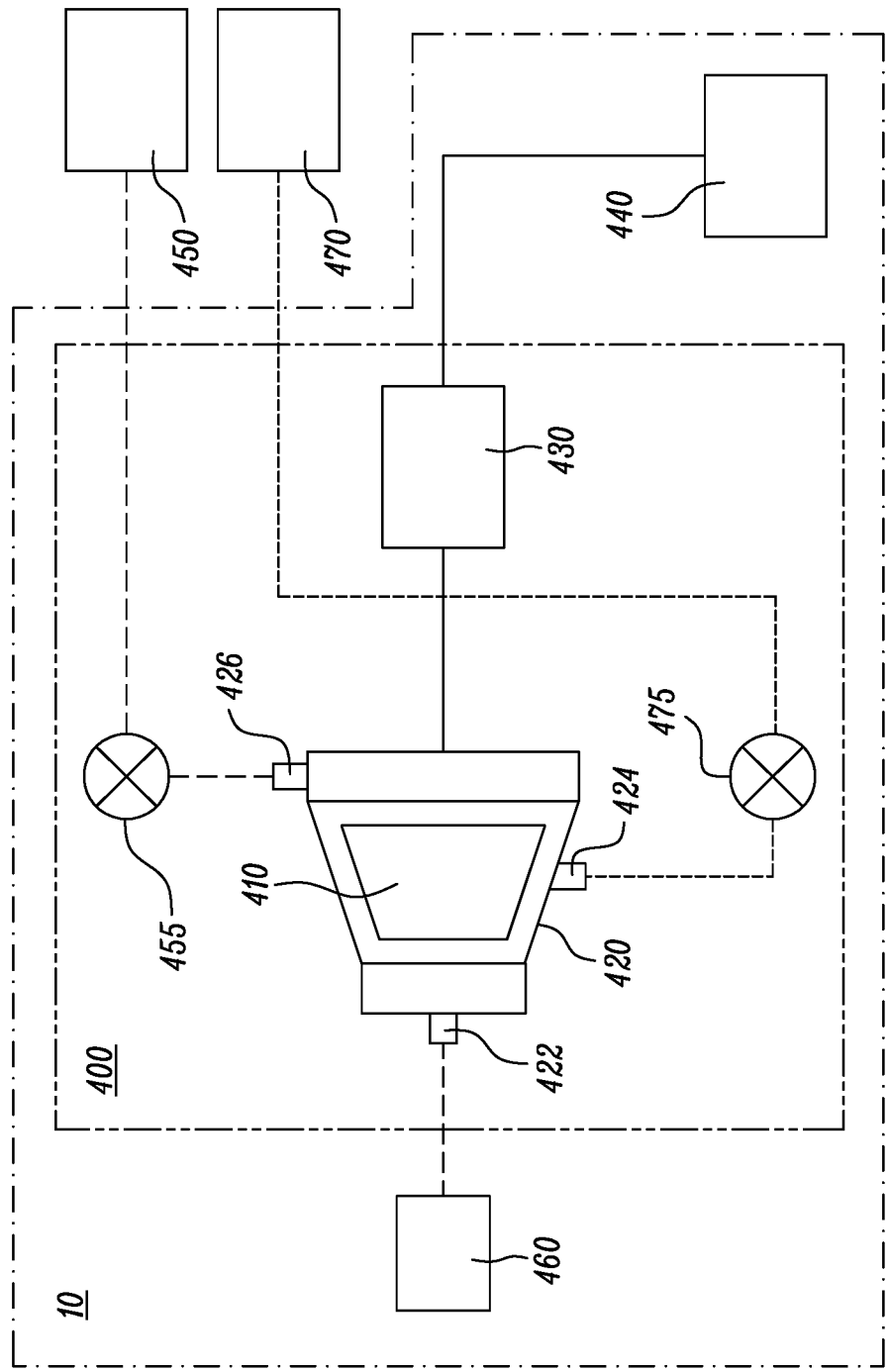
FIG. 4 shows an example blower system providing air to an airframe system and a gas turbine engine comprising the example blower system.

A diagram of an example blower system 400 for providing air to an airframe system is shown schematically in FIG. 4. The blower system 400 comprises a rotor 410 which is configured to be mechanically coupled to a spool 440 of a gas turbine engine. The spool may, for example, be the high-pressure (HP) spool of a two- or three-shaft gas turbine or an intermediate pressure (IP) spool of a three-spool engine, though any one or more spools of a gas turbine engine may be coupled to the rotor. The rotor 410 is disposed within a rotor housing 420. In the example of FIG. 4, the blower system 400 comprises a variable transmission 430 for mechanically coupling the rotor 410 to the spool 440.

The rotor 410 is configured to be driven to rotate by the spool 440 in a blower mode to draw air from an engine bleed port 422, such that the blower system 400 compresses air it receives from the gas turbine engine. The compressed air is discharged to an airframe discharge port 426 for supply to an airframe system 450 for an airframe pressurisation purpose. The airframe pressurisation purpose may be, for example, wing anti-icing, fuel tank inerting, cargo bay smoke eradication and/or aircraft cabin pressurisation. The engine bleed port 422 is in fluid communication with an air pathway (shown schematically at 460) of the gas turbine engine. Accordingly, in the blower mode, the rotor 410 draws air from the air pathway 460 of the gas turbine engine and supplies air to the airframe system 450, for example to pressurise and/or ventilate an aircraft cabin.

The rotor 410 is configured to function as a compressor in the blower mode, such that air supplied to the airframe system 450 is at a higher pressure than air drawn from the air pathway 460 of the gas turbine engine. As a result, the rotor 410 is not required to draw air from a relatively high pressure region of the gas turbine engine in order to supply pressurised air to the airframe system 450. Instead, the rotor 410 may draw air via the engine bleed port 422 from a relatively low pressure region of the gas turbine engine, such as from a bypass duct 22 of the gas turbine engine as shown in FIG. 1. If the rotor 410 were alternatively required to draw air from a relatively high pressure region of the gas turbine engine (e.g. the high pressure compressor), an efficiency of the gas turbine engine may be reduced. Therefore, the blower system 400 provides a more efficient airframe system pressurisation and ventilation system when incorporated into an aircraft. In addition, this approach reduces a scope for contamination of the air supply to the airframe system 450.

The rotor 410 is driven to rotate in the blower mode by the variable transmission 430, which itself receives drive input from the spool 440, for example through an accessory gearbox of the gas turbine engine. The speed of rotation of the spool 440 depends on the operating point of the gas turbine engine, which dictates a speed of the spool 440. The variable transmission 430 allows a rotational speed of the rotor 410 in the blower mode to be decoupled from a rotational speed of the spool 440, so that a compression performance of the rotor 410 in the blower mode is not solely governed by the operating point of the gas turbine engine (e.g. it can be controlled to operate at a target speed independent of the rotational speed of the spool, and/or at a variable speed ratio relative to the rotational speed of the spool). Inclusion of a variable transmission 430 within the blower system 400 therefore provides more versatile and adaptable means for supplying pressurised air to an airframe system. Various suitable variable transmission types will be apparent to those of ordinary skill in the art. For example, the variable transmission 430 may comprise an electric variator, as described in EP 3517436 B1.

The rotor 410 is also configured to be able to receive compressed air from an external air source 470 via an impingement port 424 to drive the spool 440 to rotate in an engine drive mode. The impingement port 424 is configured to direct air onto the rotor 410 and thereby cause the rotor 410 to rotate, which in turn drives the spool 440. The impingement port 424 may be one of a plurality of impingement ports, each configured to direct air onto the rotor 410 and thereby cause the rotor 410 to rotate.

The external air source 470 may be provided by, for example, an auxiliary power unit (APU) of the aircraft or ground starting equipment (GSE). In the example of FIG. 4, the rotor 410 is configured to discharge air to the engine bleed port 422 in the engine drive mode. However, it will be appreciated that the rotor 410 may discharge air elsewhere in the engine drive mode, such as to a dedicated auxiliary port, for example. Air discharged from the rotor 410 via a dedicated auxiliary port may be used for other purposes, for example for cooling other systems and/or components of the gas turbine engine and/or the aircraft in the engine drive mode.

The rotor 410 is configured to function as a turbine in the engine drive mode, such that the spool 440 can be driven to rotate by the rotor 410. Generally, the blower system 400 can drive rotation of the spool 440 to a rotational speed which is sufficient to enable the gas turbine engine to successfully execute an ignition process. Consequently, the blower system 400 dispenses with a need to provide a dedicated air turbine starting system or an electric starting system to the gas turbine engine, each of which are associated with additional weight and system complexity. Additionally or alternatively, the blower system 400 may be able to drive the spool 440 to rotate at a lower speed, for example to prevent the formation of a bowed engine rotor condition following engine shutdown or to reduce a bowed engine rotor condition prior to engine start.

In the example of FIG. 4, the blower system 400 further comprises a primary valve 455 which is configured to isolate the airframe discharge port 426 from the airframe system 450 in the engine drive mode, and to permit flow to the airframe system 450 in the blower mode. Similarly, in this example the blower system 400 further comprises a secondary valve 475 configured to isolate the impingement port 424 from the external air source 470 in the blower mode, and to permit flow from the external air source 470 in the engine drive mode. The secondary valve 475 may be further configured to control a mass flow and a pressure of an air flow from the external air source 470 to the airframe discharge port 426 in the engine drive mode.

The use of the blower system 400 allows for a system in which the rotor 410 rotates in the same rotation direction (i.e. clockwise or anti-clockwise) in both the engine drive mode and the blower mode. In this way, in the engine drive mode of the blower system 400 the rotor 410 will drive the spool 440 to rotate in the same direction that the spool 440 rotates when it drives the rotor 410 in the blower mode. This allows for the omission of a separate reversing mechanism to permit the spool 440 to be driven to rotate in its starting direction, which will be the same as the direction it rotates during when driving the rotor 410 in the blower mode of the blower system 400. A separate reversing mechanism would result in additional mechanical efficiency losses in, and increased weight of and/or a reduced reliability of, the blower system 400.

FIG. 4 also schematically shows a gas turbine engine 10 comprising the first example blower system 400. The gas turbine engine 10 may be in accordance with the gas turbine engine 10 described above with respect to FIG. 1 and/or FIG. 2.

Various examples of a rotor for use in the rotor 410 of the blower system 400 will now be described with reference to FIGS. 5A-10B.

Figure 5A:
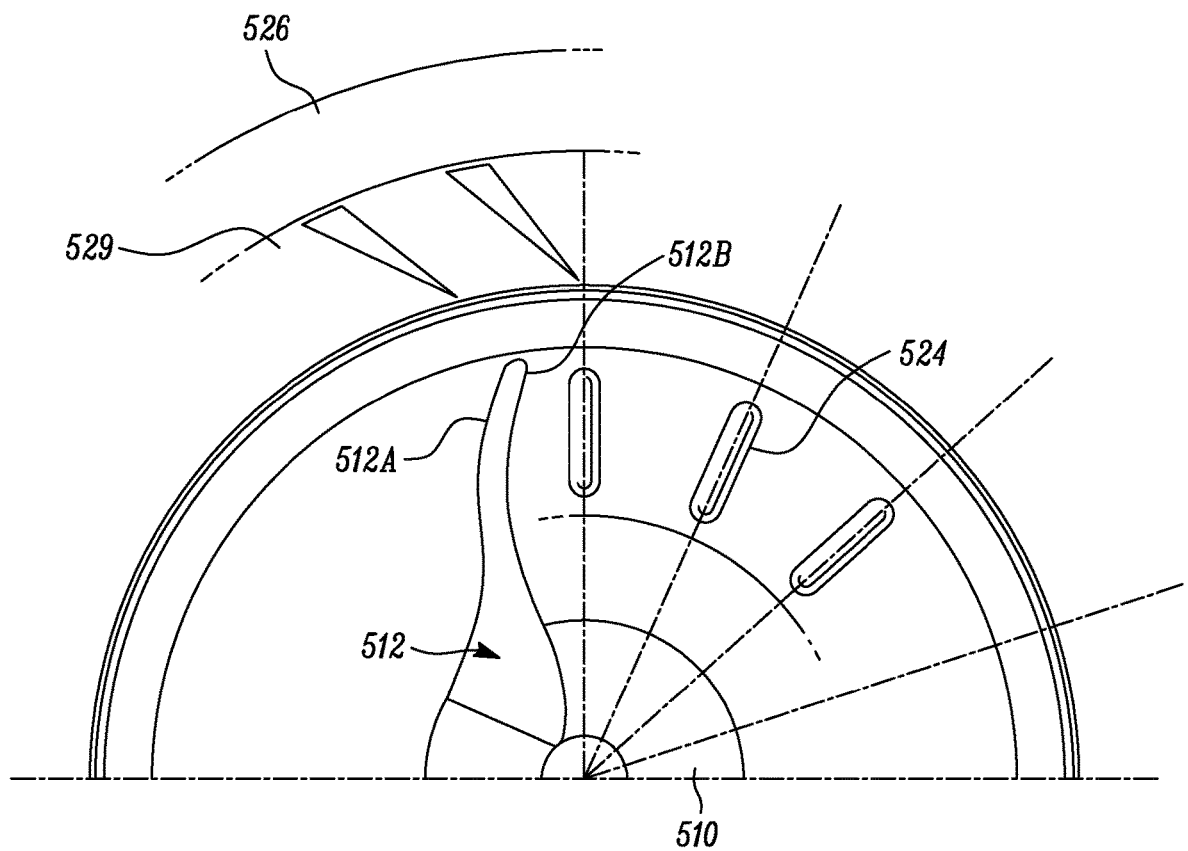
FIG. 5A shows a front view of a first example rotor disposed within a first example rotor housing.
Figure 5C:
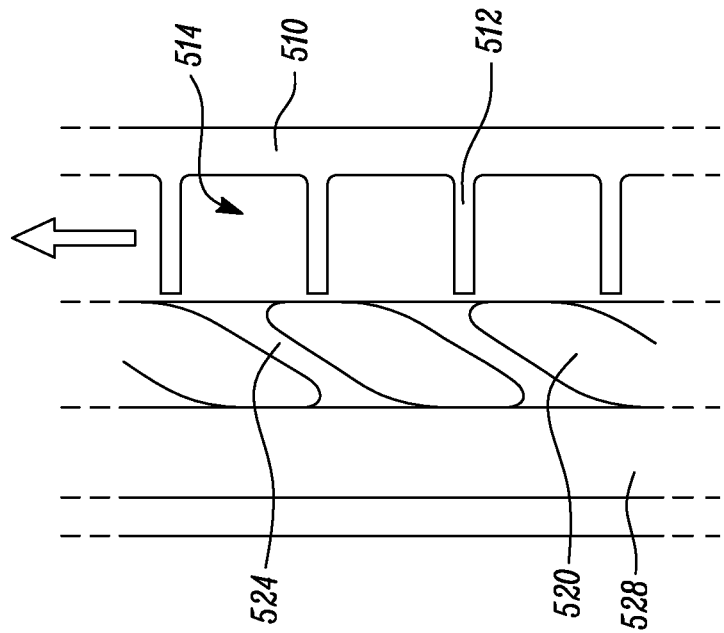
FIG. 5C shows a radial view of a first example rotor disposed within a first example rotor housing
Figure 5B:
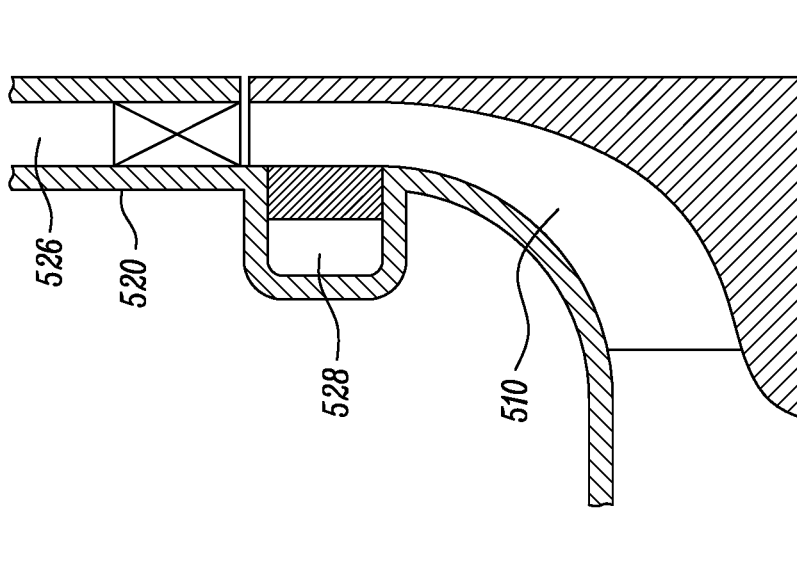
FIG. 5B shows a cross-sectional view of a first example rotor disposed within a first example rotor housing.

FIGS. 5A-5C show a front view, a cross-sectional view and a radial view, respectively, of a first example rotor 510 disposed within a first example rotor housing 520. The rotor 510 comprises a plurality of rotor blades 512 and is configured to function as a centrifugal compressor in the blower mode. Each of the plurality of rotor blades 512 is disposed on a first side 514 (i.e. a first axial side of the rotor with reference to the rotation axis of the rotor) of the rotor 510 and has a leading side 512A and a trailing side 512B with respect to a direction of rotation in the blower mode (i.e. a direction to compress air flowing through the rotor 510). The expressions leading side and trailing side are not to be confused with the expressions "leading edge" and "trailing edge", which respectively relate to the loci of maximum curvature at upstream and downstream ends of an aerofoil over which a flow passes along a chordwise extent. In contrast, the rotor blades of the present example function as a centrifugal compressor with the flow being generally radial along the blades. For such blades, the leading side is the side which generally faces the direction of rotation, whereas the trailing side is that which generally opposes the direction of rotation.

The example rotor housing 520 defines a circumferentially-extending plenum chamber 528 (best shown in FIG. 5C) on a first side (i.e. a first axial side of the housing with reference to the rotation axis of the rotor) which comprises a plurality of impingement ports 524. In a variant example, the rotor housing 520 may only comprise a single impingement port. The plenum chamber 528 is configured to receive compressed air from an external air source. Each of the plurality of impingement ports 524 are configured to direct air from the plenum chamber 528 onto the rotor 510 (in this example, onto the first side) to impinge onto the blades 512 and thereby cause the rotor 510 to rotate in the engine drive mode. In this example, the plenum chamber 528 and each of the plurality of impingement ports 524 is located in a radially outer region of the rotor housing so that the impingement ports direct flow onto a radially outer region of the blades 512.

The plurality of impingement ports 524 are configured to direct air onto the trailing side 512B of each rotor blade 512 and thereby cause the rotor 510 to rotate. The plurality of impingement ports 524 are configured so that the rotor 510 rotates in the same direction in both the blower mode and the engine drive mode.

An airframe discharge port 526 is configured to receive air from the first axial side 514 of the rotor 510 in the blower mode. Accordingly, in the example of FIGS. 5A-5C, the airframe discharge port 526 and the or each impingement port 524 is configured to receive air from and to direct air onto the same axial side 514 of the rotor 510. Therefore, the first side 514 of the rotor 510 is configured to function as a compressor in the blower mode and also to function as a turbine in the engine drive mode of the blower system 400. The rotor 510 is therefore able to operate as both a compressor and a turbine in respective modes of the blower system 400 while remaining geometrically compact and lightweight.

The rotor housing 520 may further define a diffuser 529 disposed around and outside of a periphery of the rotor 510 (i.e. outside of the region circumscribed by the rotor tips). The diffuser 529 may be, for example, a variable height diffuser which may be adjusted so as to modify a compression performance of the rotor 510 in the blower mode. In the example of FIGS. 5A-C, the airframe discharge port 526 is shown as being disposed around the diffuser 529 of the rotor 510. However, it will be appreciated that in other examples, the airframe discharge port 526 may be otherwise disposed with respect to the rotor 510 so as to receive air from the first axial side 514 of the rotor 510 in the blower mode.

Figure 6B:
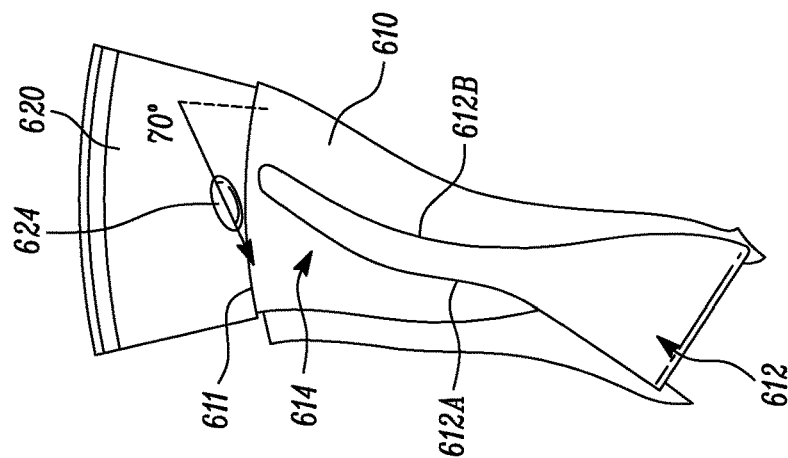
FIG. 6B shows a detail view of a second example rotor disposed within a second example rotor housing.
Figure 6A:
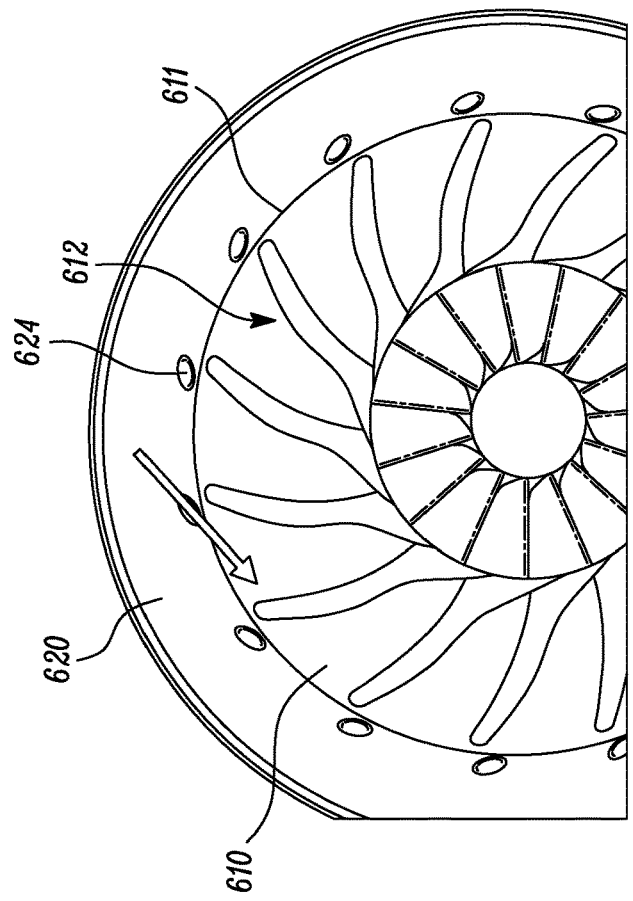
FIG. 6A shows a top view of a second example rotor disposed within a second example rotor housing.

FIGS. 6A-6B show an axial view and a detailed perspective view, respectively, of a second example rotor 610 disposed within a second example rotor housing 620. The rotor 610 comprises a plurality of rotor blades 612 and is configured to function as a centrifugal compressor in the blower mode. Each of the plurality of rotor blades 612 is disposed on a first axial side 614 of the rotor 610 and has a leading side 612A and a trailing side 612B with respect to a direction of rotation in the blower mode. The direction of rotation in the blower mode is the rotational direction in which the rotors would cause compression of the respective flow. The direction of rotation may be specified by the mechanical connection of the rotor 610 to the engine spool as described above.

The rotor housing 620 defines a plurality of impingement ports 624 for use in the engine drive mode. Each of the plurality of impingement ports 624 extends through the rotor housing 620 and is configured to receive compressed air from an external air source and to direct air onto the rotor 610 to thereby cause the rotor 610 to rotate. In this example, each of the plurality of impingement ports 624 is located outside of a periphery 611 of the rotor 610 (i.e. outside of a region circumscribed by rotation of the rotor tips). In addition, each of the plurality of impingement ports 624 has a substantially circular cross-section in this example. However, it will be appreciated that in other examples, each of the plurality of impingement ports 624 may have a cross-section of any suitable geometry.

Specifically, the plurality of impingement ports 624 are configured to direct air onto the trailing side 612B of each rotor blade 612 to cause the rotor 510 to rotate in the same direction of rotation as in the blower mode.

Each of the plurality of impingement ports 624 extends through the rotor housing 624 at an extension angle which enables air to be directed onto the trailing side 612B of each rotor blade 612 at a predetermined impingement angle with respect to a radial direction from the rotation axis of the rotor through the respective impingement port. The predetermined impingement angle may be selected to as to optimise a turbine efficiency of the rotor 510 when functioning as a turbine in the engine drive mode of the blower system 400. The predetermined impingement angle may be, for example, between 45 degrees and 90 degrees. Preferably, the predetermined impingement angle may be between 60 degrees and 80 degrees. More preferably, the predetermined impingement angle may be approximately 70 degrees.

As in the example of FIGS. 5A-5C, an airframe discharge port and the or each impingement port 624 is configured to receive air from and to direct air onto the same side 614 of the rotor 610.

Figure 7:
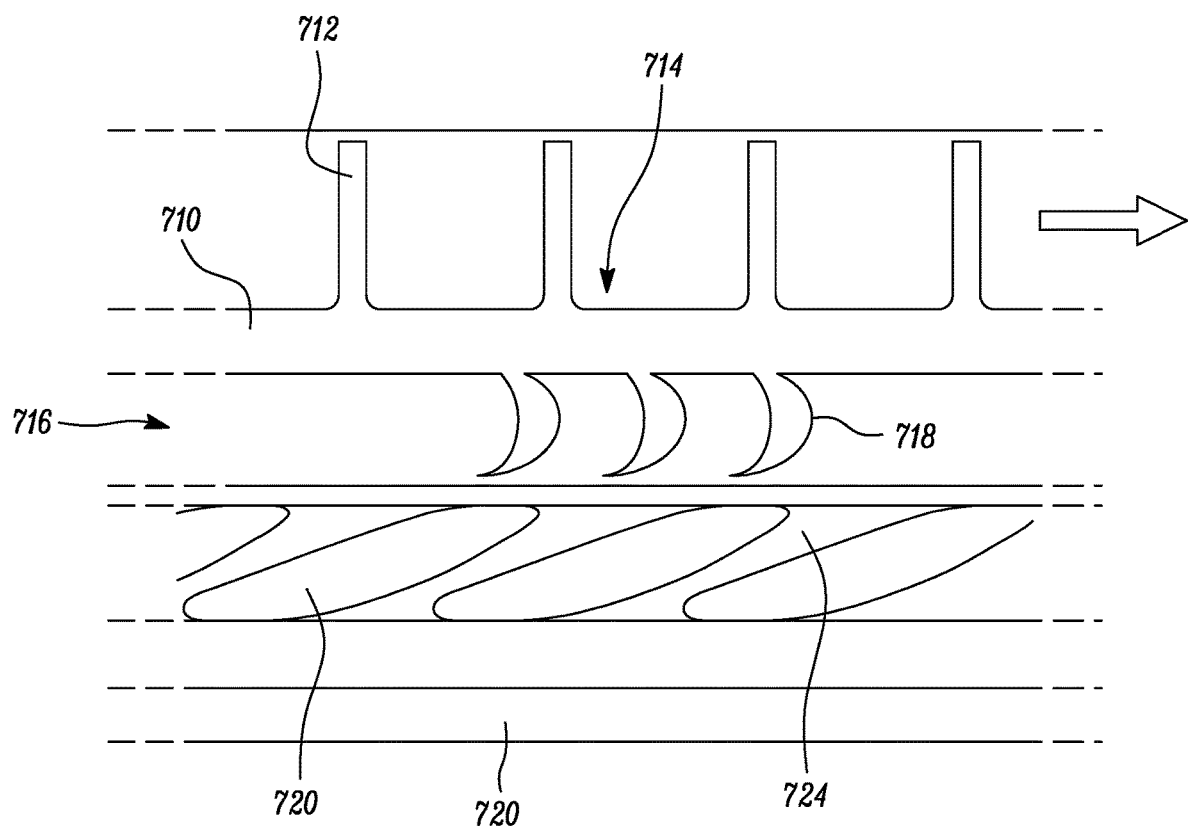
FIG. 7 shows a radial view of a third example rotor disposed within a third example rotor housing.

FIG. 7 shows a radial view (i.e. along a radial axis with respect to the rotation axis of the rotor) of a third example rotor 710 disposed within a third example rotor housing 720. The rotor 710 is generally configured to function as a centrifugal compressor in the blower mode and as a turbine in the engine drive mode, as in the first and second example rotors and rotor housing as described above. The rotor 710 comprises a plurality of compressor blades 712 disposed on a first side 714 of the rotor 710. Each of the plurality of compressor blades 712 is configured to direct air toward the airframe discharge port in the blower mode in the same manner as the rotor blades 512, 612 of the first and second examples. In addition, the rotor 710 comprises a plurality of turbine blades 718 disposed on a second axial side 716 of the rotor 710, wherein the second side 716 opposes the first side 714. The first and second sides may be separated by a wall of the rotor 710 that prevents flow migrating from one side of the other. For example, the wall may take the form of a disc forming a base of impeller channels defined between the compressor blades 712 on the first side.

The rotor housing 720 defines a plurality of impingement ports 724 axially adjacent the rotor 710 on the second side. Each of the plurality of impingement ports 724 extends through the rotor housing 720 and is configured to receive compressed air from an external air source and to direct the air onto the second side 716 of the rotor 710 to cause the rotor 710 to rotate, and to rotate in the same direction as the direction of rotation of the compressor blades 712 to cause compression in the blower mode.

The plurality of turbine blades 718 disposed on the second side 716 are configured for expanding air when driven to rotate by the air, whereas the plurality of compressor blades 712 disposed on the first side 714 are configured for compressing air when mechanically driven to rotate. In other words, the first side 714 of the rotor 710 is adapted to function as a compressor, while the second side 716 of the rotor 710 is adapted to function as a turbine. In this particular example, the second side 716 is adapted to function as a reaction turbine.

By providing separate compressor and turbine blades, a geometry of each of the plurality of rotor blades 712 may be selected so as to optimise a compressor efficiency of the rotor 710 when functioning as a compressor in the blower mode without any need to compromise a turbine efficiency of the rotor 710 when functioning as a turbine in the engine drive mode. Likewise, a geometry of each of the plurality of turbine blades 718 may be selected so as to optimise the turbine efficiency of the rotor 710 when functioning as a turbine in the engine drive mode without any impact on the compressor efficiency of the rotor 710 when functioning as a compressor in the blower mode. As a result, both the compressor efficiency and the turbine efficiency of the rotor 710 may be somewhat optimised without a need for variable geometry features within the rotor 710 or the rotor housing 720, such as rotatable vanes.

Figure 8:
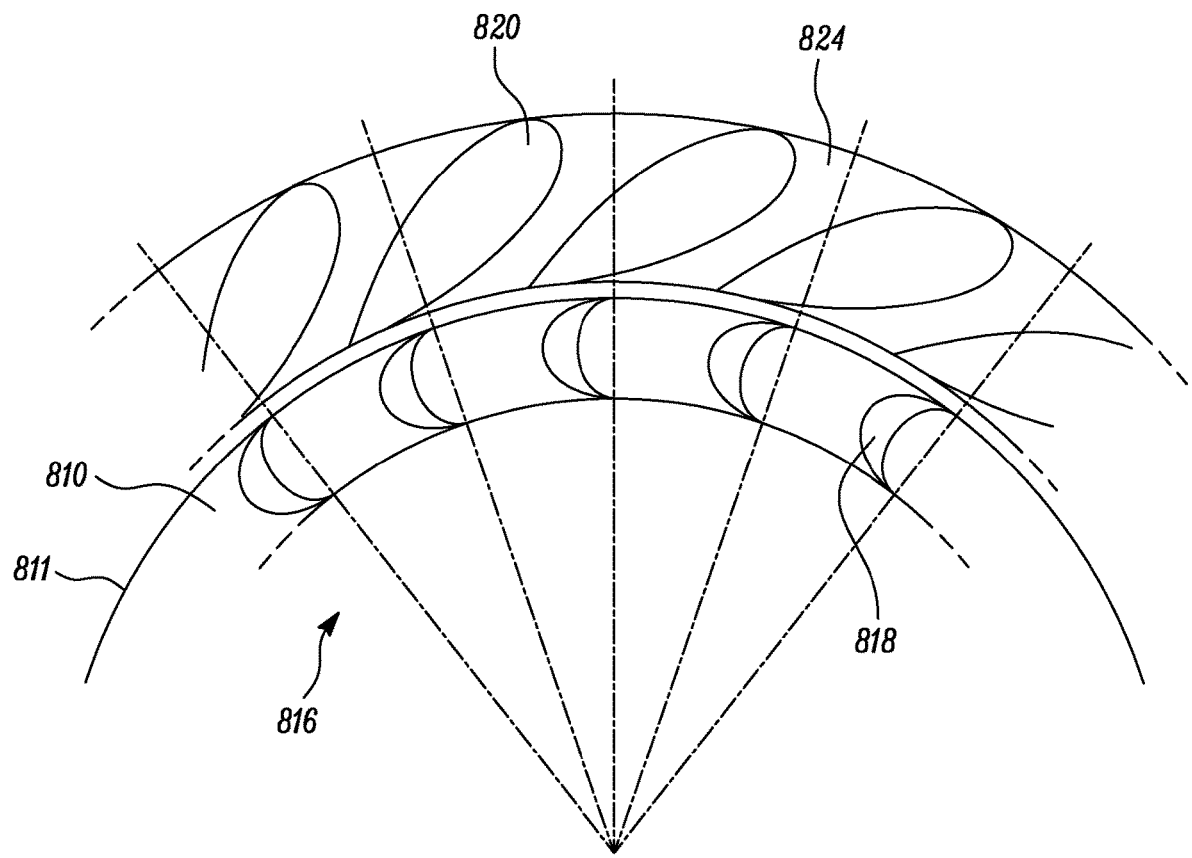
FIG. 8 shows a rear view of a sector of a fourth example rotor disposed within a fourth example rotor housing.

FIG. 8 shows a rear view of a sector of a fourth example rotor 810 disposed within a fourth example rotor housing 820. The fourth example rotor 810 is similar to the third example rotor 710 described above with reference to FIG. 7 in that it comprises a plurality of turbine blades 818 disposed on a second side 816 of the rotor 810 which opposes a first side thereof. The first side of the rotor 810 comprises a plurality of compressor blades as described above with reference to FIG. 7, with the rotor 810 being configured to have its respective functions when rotating in the same direction in each of the respective modes. However, in contrast to the third example rotor housing 720, the fourth example rotor housing 820 defines a plurality of impingement ports 824 which are disposed radially outward of a periphery 811 of the rotor 810.

Each of the plurality of impingement ports 824 is configured to receive compressed air from an external air source and to direct air onto the second side 816 of the rotor 810 to cause the rotor 810 to rotate.

Figure 9:
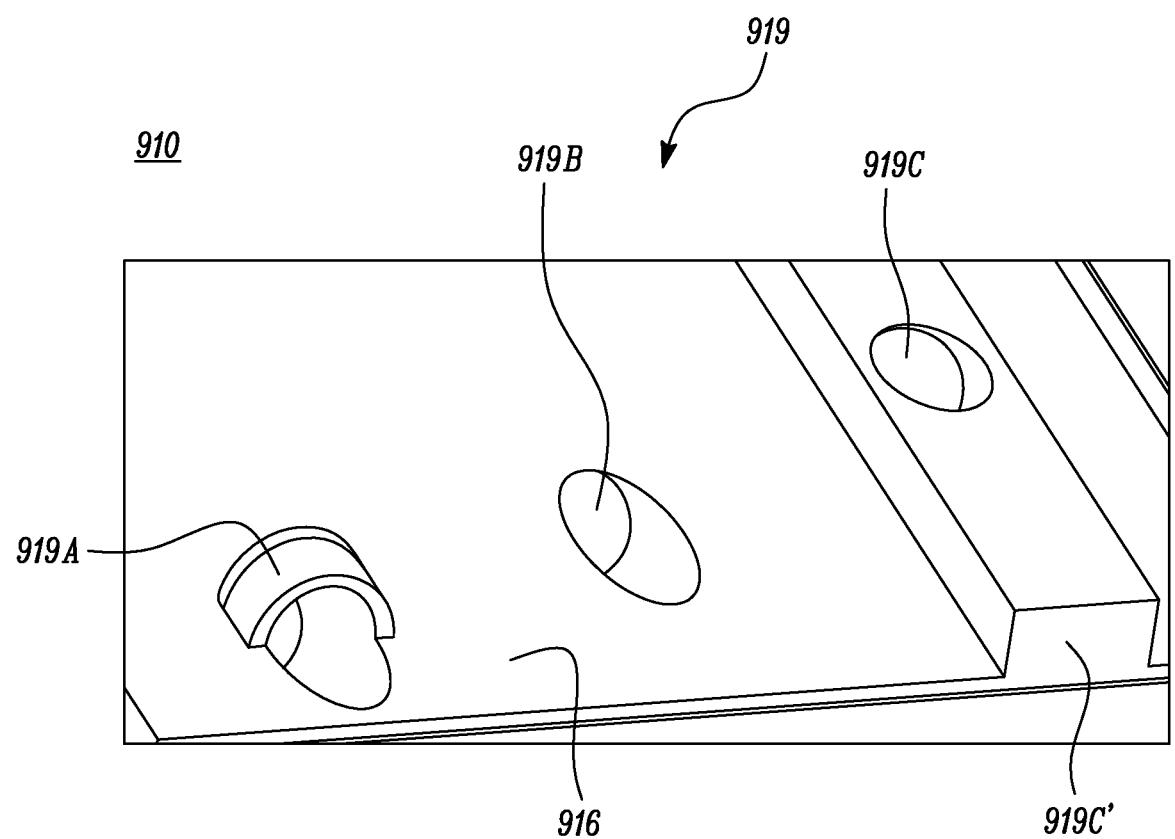
FIG. 9 shows a perspective view of a second side of a fifth example rotor.

FIG. 9 shows a perspective view of a second side 916 of a fifth example rotor 910 which opposes a first side thereof. The first side of the rotor 910 comprises a plurality of compressor blades as described above with reference to FIG. 7. The second side 916 comprises a plurality of impulse scoops 919. The plurality of impulse scoops 919 are configured to receive air from respective impingement ports such as those described with reference to the third and fourth examples above, so as to be driven to rotate in the engine drive mode (once again, in the same direction of rotation as that in the blower mode when the rotor is mechanically driven by the engine spool to compress air).

However, while the plurality of turbine blades of the third example rotor 710 and of the fourth example rotor 810 are configured such that the second side of the rotor functions as a reaction turbine in the engine drive mode, the plurality of impulse scoops 919 are configured such that the second side 916 functions as an impulse turbine in the engine drive mode. The plurality of impulse scoops 919 may provide a more geometrically compact and lightweight rotor 910 than the example rotors 710, 810 which comprise a plurality of turbine blades 718, 818 as shown in FIGS. 7 and 8.

For illustrative purposes, the plurality of scoops 919 shown in FIG. 9 comprises a first scoop 919A, a second scoop 919B and a third scoop 919C. In the example of FIG. 9, each scoop has a different geometry and construction to illustrate various forms which such scoops may take. However, it will be appreciated that in other examples, each of the plurality of scoops 919 may have a substantially identical geometry and construction to one another. In addition, the plurality of scoops 919 may comprise any number of scoops.

In a similar way to the third example rotor 710 and the fourth example rotor 810, the fifth example rotor 910 is configured to function as a centrifugal compressor in the blower mode. Likewise, the airframe discharge port is configured to receive air from a first side of the rotor 910 in the blower mode, whereas the or each impingement port is configured to direct air onto the second side 916 of the rotor 910 in the engine drive mode.

The first scoop 919A has a complex geometry comprising a protruding guide which protrudes beyond a substantially continuous surface of the second side to direct air into a blind hole of the first scoop. It may therefore be particularly complex to manufacture and may be associated with inefficiencies when the rotor 910 is operating as a compressor in the blower mode. The alternative second scoop 919B has a simpler construction without a protruding guide over a blind hole. However, it may be that a thickness of the second side 916 of the rotor 910 may be insufficient (or a thickness is required to increase) to allow the second scoop 919B to have sufficient depth for its purpose without compromising the integrity of the rotor 910 or breaking through to the first side of the rotor. The further alternative third scoop 919C is similar in geometry and construction to the second scoop 919B but is disposed on a step 919C' which provides additional local thickness to the rotor 910 in the region proximal to the third scoop 919C. The third scoop 919C is considered to provide a particularly good balance of manufacturing complexity, performance and weight.

Figure 10:
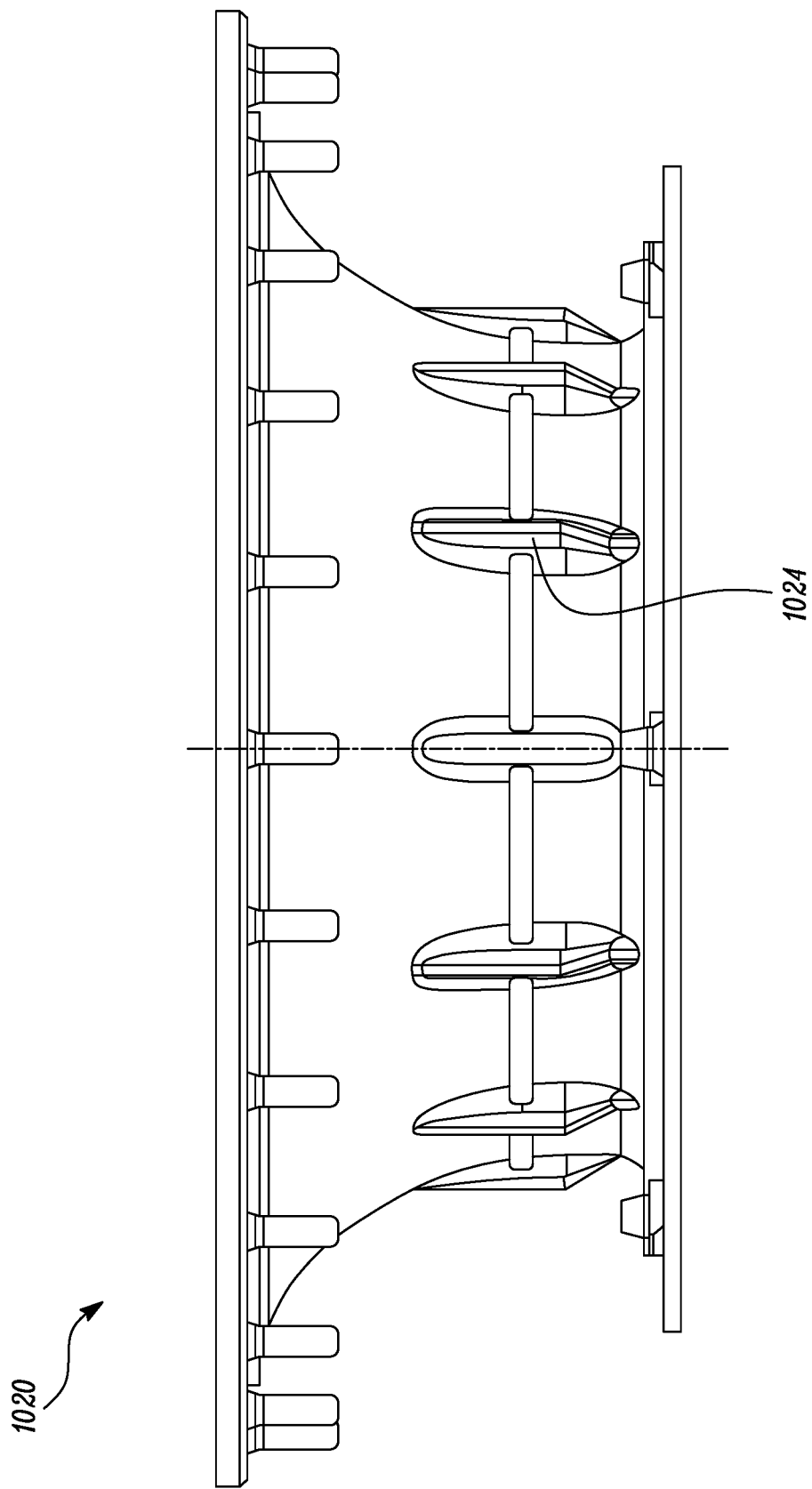
FIG. 10 shows a side view of a sector of a sixth example rotor housing.

FIG. 10 shows a side view of a sector of an example rotor housing 1020, the features of which may be combined with any of the example rotor housing described above. As shown in FIG. 10, a blower system 400 according to the present disclosure may be configured to provide a recirculation pathway for recirculating compressed air from the rotor in the blower mode. The recirculation pathway may include a plurality of impingement ports (illustrated with reference numeral 1024 in FIG. 10), such that the or each impingement port functions as a recirculation bleed port in the blower mode in addition to providing the respective function of an impingement port to cause the rotor to rotate in the engine drive mode. The example rotor housing 1020 defines a plurality of impingement ports 1024, wherein each impingement port 1024 also functions, in the blower mode, as a recirculation bleed port.

Figure 11B:
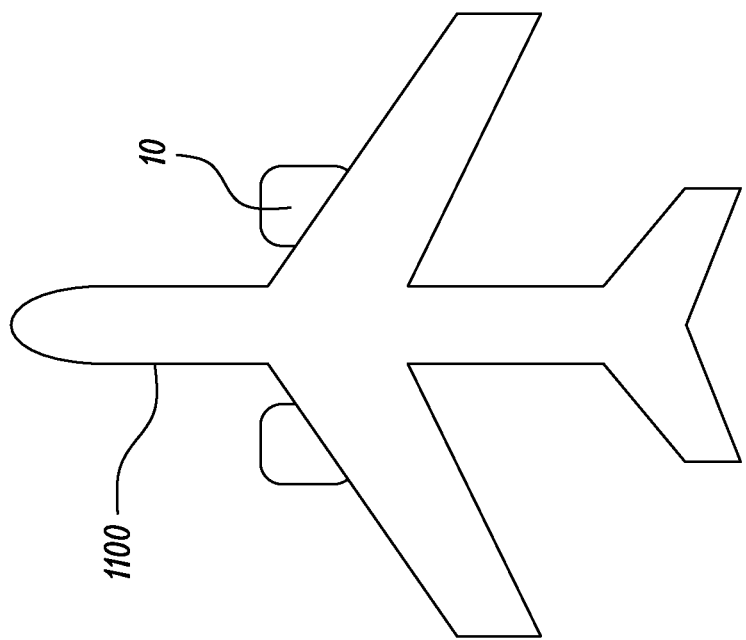
FIG. 11B shows an aircraft comprising the gas turbine engine of FIG. 4.
Figure 11A:
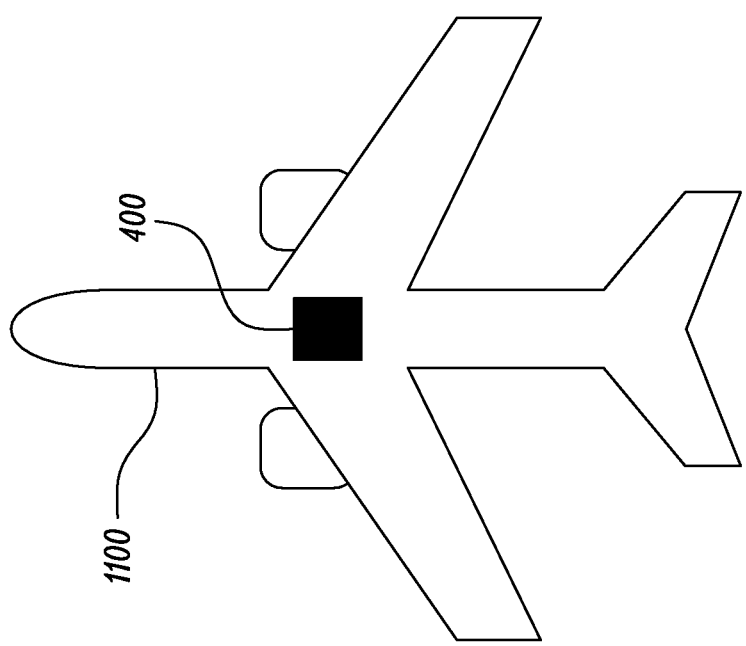
FIG. 11A shows an aircraft comprising the blower system of FIG. 4.

FIG. 11A shows an aircraft 1100 comprising a blower system 400 as described above with reference to FIG. 4 (optionally modified according to any of the further examples). FIG. 11B shows an aircraft comprising a gas turbine engine 10 in accordance with the gas turbine engine 10 described above with respect to FIG. 4.

It will be understood that the disclosure is not limited to the embodiments above-described and various modifications and improvements can be made without departing from the concepts described herein. In particular, while various embodiments which comprise a rotor configured to function as a centrifugal compressor in the blower mode have been described and illustrated, it will be understood that other embodiments may comprise a rotor configured to function as an axial compressor in the blower mode. In addition, while the present disclosure primarily concerns blower systems for providing air to a cabin of an aircraft, the disclosed blower systems may also be used for providing air to other structures.

Except where mutually exclusive, any of the features may be employed separately or in combination with any other features and the disclosure extends to and includes all combinations and sub-combinations of one or more features described herein. The scope of protection is defined in the appended claims.

The invention claimed is:

1. A blower system for providing air to an airframe system, comprising:
a rotor configured to be mechanically coupled to a spool of a gas turbine engine;
wherein the rotor is configured to:
in a blower mode, be driven to rotate by the spool to discharge air to an airframe discharge port for supply to the airframe system;
in an engine drive mode, receive air from an external air source via an impingement port that is configured to direct the received air onto the rotor and thereby drive the rotor to rotate to drive the spool to rotate; and
rotate in the same direction in both the blower mode and the engine drive mode.

2. A blower system according to claim 1, further comprising a variable transmission for mechanically coupling the rotor to the spool.

3. A blower system according to claim 1, wherein the impingement port is one of a plurality of impingement ports, each configured to direct air onto the rotor and thereby cause the rotor to rotate.

4. A blower system according to claim 3, wherein the rotor is configured to rotate in a first direction to compress air for discharge to the airframe discharge port; and wherein the or each impingement port is configured to direct air onto the rotor to drive it to rotate in the same first direction.

5. A blower system according to claim 4, wherein the rotor is configured to function as a centrifugal compressor in the blower mode, and wherein:
the rotor comprises a plurality of rotor blades each having a leading side and a trailing side with respect to the direction of rotation in the blower mode; and
wherein the or each impingement port is configured to direct air to impinge onto the trailing side of each rotor blade.

6. A blower system according to claim 4, wherein the rotor is configured to function as a centrifugal compressor in the blower mode, and wherein:
the rotor comprises a plurality of compressor blades on a first side of the rotor for directing air to the airframe discharge port in the blower mode; and
the rotor further comprises a plurality of turbine blades on a second side of the rotor for receiving air from the or each impingement port in the engine drive mode.

7. A blower system according to claim 4, wherein the rotor is configured to function as a centrifugal compressor in the blower mode, and wherein:
the rotor comprises a plurality of compressor blades on a first side of the rotor for directing air to the airframe discharge port in the blower mode; and
wherein a plurality of impulse scoops are provided on the second side of the rotor, the plurality of impulse scoops being configured to receive air from the or each impingement port in the engine drive mode.

8. A blower system according to claim 4, wherein the blower system is configured to provide a recirculation pathway for recirculating compressed air in the blower mode, and wherein the recirculation pathway includes the or each impingement port.

9. A blower system according to claim 3, further comprising:

a primary valve configured to isolate the airframe discharge port from the airframe system in the engine drive mode; and
a secondary valve configured to isolate the or each impingement port from the external air source in the blower mode.

10. A blower system according to claim 1, being a cabin blower system wherein the airframe system comprises a cabin of an aircraft.

11. A gas turbine engine for an aircraft, the gas turbine engine comprising a blower system according to claim 1.

12. An aircraft comprising:
a blower system according to claim 1.

13. An aircraft comprising:
a gas turbine engine according to claim 11.

14. A blower system for providing air to an airframe system, comprising:
a rotor configured to be mechanically coupled to a spool of a gas turbine engine;
wherein the rotor is configured to:
in a blower mode, be driven to rotate by the spool to discharge air to an airframe discharge port for supply to the airframe system; and
in an engine drive mode, receive air from an external air source via an impingement port that is configured to direct the received air onto the rotor and thereby drive the rotor to rotate to drive the spool to rotate;
wherein the impingement port is one of a plurality of impingement ports, each configured to direct air onto the rotor and thereby cause the rotor to rotate; and
wherein the rotor is configured to rotate in a first direction to compress air for discharge to the airframe discharge port; and wherein the or each impingement port is configured to direct air onto the rotor to drive it to rotate in the same first direction.

15. A blower system according to claim 14, wherein the rotor is configured to function as a centrifugal compressor in the blower mode, and wherein:
the rotor comprises a plurality of rotor blades each having a leading side and a trailing side with respect to the direction of rotation in the blower mode; and
wherein the or each impingement port is configured to direct air to impinge onto the trailing side of each rotor blade.

16. A blower system according to claim 14, wherein the rotor is configured to function as a centrifugal compressor in the blower mode, and wherein:
the rotor comprises a plurality of compressor blades on a first side of the rotor for directing air to the airframe discharge port in the blower mode; and
the rotor further comprises a plurality of turbine blades on a second side of the rotor for receiving air from the or each impingement port in the engine drive mode.

17. A blower system according to claim 14, wherein the rotor is configured to function as a centrifugal compressor in the blower mode, and wherein:
the rotor comprises a plurality of compressor blades on a first side of the rotor for directing air to the airframe discharge port in the blower mode; and
wherein a plurality of impulse scoops are provided on the second side of the rotor, the plurality of impulse scoops being configured to receive air from the or each impingement port in the engine drive mode.

18. A blower system according to claim 14, wherein the blower system is configured to provide a recirculation pathway for recirculating compressed air in the blower mode, and wherein the recirculation pathway includes the or each impingement port.

\* \* \* \* \*